United States Patent
Kang et al.

(10) Patent No.: US 12,470,440 B2
(45) Date of Patent: Nov. 11, 2025

(54) CHANNEL EQUALIZATION DEVICE AND METHOD, AND COMPUTER READABLE STORAGE MEDIUM STORING INSTRUCTIONS TO PERFORM CHANNEL EQUALIZATION METHOD

(71) Applicant: Korea Advanced Institute of Science and Technology, Daejeon (KR)

(72) Inventors: Joonhyuk Kang, Daejeon (KR); Woojun Lee, Daejeon (KR); Sangwoo Park, Daejeon (KR); Dongwon Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 92 days.

(21) Appl. No.: 18/502,140

(22) Filed: Nov. 6, 2023

(65) Prior Publication Data
US 2024/0223409 A1 Jul. 4, 2024

(30) Foreign Application Priority Data
Dec. 29, 2022 (KR) .................. 10-2022-0189024

(51) Int. Cl.
*H04L 25/03* (2006.01)
*H04L 25/02* (2006.01)

(52) U.S. Cl.
CPC .... *H04L 25/03165* (2013.01); *H04L 25/0254* (2013.01); *H04L 25/03949* (2013.01)

(58) Field of Classification Search
CPC ........... H04L 25/03165; H04L 25/0254; H04L 25/03178; H04L 25/03949
See application file for complete search history.

(56) References Cited

U.S. PATENT DOCUMENTS

| | | | |
|---|---|---|---|
| 11,451,419 B2* | 9/2022 | Li | H04B 1/16 |
| 2021/0266125 A1* | 8/2021 | Pezeshki | H04W 88/06 |
| 2022/0191067 A1* | 6/2022 | Ait Aoudia | H04B 1/7113 |
| 2023/0082536 A1* | 3/2023 | Hoydis | H04L 1/0041 |
| | | | 706/25 |
| 2024/0267061 A1* | 8/2024 | Alic | H03M 13/2957 |

FOREIGN PATENT DOCUMENTS

| | | |
|---|---|---|
| KR | 101992053 B1 | 6/2019 |
| KR | 102064301 B1 | 1/2020 |

OTHER PUBLICATIONS

Office Action of KIPO for Korean application No. 1020220189024, issued on Dec. 7, 2023.

\* cited by examiner

*Primary Examiner* — Dac V Ha
(74) *Attorney, Agent, or Firm* — NKL Law; Jae Youn Kim

(57) ABSTRACT

There is provided a channel equalization device. The channel equalization device comprises a receiver configured to receive a plurality of consecutive reception symbol sequences through multiple channels; a memory storing one or more instructions; and a processor configured to execute the one or more instructions stored in the memory, wherein the instructions, when executed by the processor, cause the processor to estimate a transmission symbol at a position of interest among a plurality of consecutive transmission symbol sequences based on the plurality of received reception symbol sequences using a neural filter trained by training reception symbol sequences.

20 Claims, 8 Drawing Sheets

CHANNEL EQUALIZATION DEVICE AND METHOD, AND COMPUTER READABLE STORAGE MEDIUM STORING INSTRUCTIONS TO PERFORM CHANNEL EQUALIZATION METHOD

This work was supported by Institute for Information & communications Technology Promotion (IITP) grant funded by the Korea government (MSIT)(No. 2020-0-01787, Development of Convergent Innovation Technologies in Communication and Computing for Superintelligent Services)

TECHNICAL FIELD

The present disclosure relates to a channel equalization device and method for frequency selective channel flattening.

BACKGROUND

In current communication systems, wideband transmission has the advantage of increasing a data transmission rate of systems but has a possibility of occurrence of frequency selective fading of a radio channel. A simplest method of dealing with such a wideband signal is to flatten a received signal using a linear filter.

Flattening aims to accurately reconstruct a transmitted signal by removing inter-symbol interference (ISI) as much as possible, and there is an LMMSE estimator known as a most widely used linear filter. However, it is not easy to implement the LMMSE estimator because it preferably requires an infinite filter size in practical use.

To solve this problem, in a case in which sufficient computational power is provided to a receiver, block-wise demodulation for predicting a discrete transmission symbol sequence from a received signal may be used. The most representative method is a Viterbi algorithm for obtaining an optimal block error rate through estimation that maximizes a likelihood.

SUMMARY

An object of the present disclosure is to provide a channel equalization device and method for estimating a transmission symbol at a position of interest among transmission symbol sequences using a neural filter.

However, the object to be achieved by the present disclosure is not limited to that mentioned above, and other objects that are not mentioned can be clearly understood by those skilled in the art from the description below.

In accordance with an aspect of the present disclosure, there is provided a channel equalization device, the channel equalization device comprises: a receiver configured to receive a plurality of consecutive reception symbol sequences through multiple channels; a memory storing one or more instructions; and a processor configured to execute the one or more instructions stored in the memory, wherein the instructions, when executed by the processor, cause the processor to estimate a transmission symbol at a position of interest among a plurality of consecutive transmission symbol sequences based on the plurality of received reception symbol sequences using a neural filter trained by training reception symbol sequences.

The processor may generate the neural filter by training the plurality of training reception symbol sequences.

The processor may train the plurality of training reception symbol sequences labeled with a training transmission symbol at the learning position of the interest among consecutive learning transmission symbol sequences.

The processor may generate the neural filter using supervised learning.

The memory may store the neural filter in advance and provide the neural filter stored in advance to the processor at the request of the estimator.

The channel equalization device may comprise a communication unit configured to receive the neural filter from the outside and provide the neural filter to the processor at the request of the estimator.

The processor may transmit the plurality of received reception symbol sequences to a cloud including the neural filter and receive the transmission symbol at the position of interest output by the neural filter from the cloud.

In accordance with another aspect of the present disclosure, there is provided a channel equalization method, the method comprises: receiving a plurality of consecutive reception symbol sequences through multiple channels; and estimating a transmission symbol at a position of interest among a plurality of consecutive transmission symbol sequences based on the plurality of received reception symbol sequences using a neural filter trained by training reception symbol sequences.

The channel equalization method may include generating the neural filter by training the plurality of training reception symbol sequences.

The generating the neural filter may include learning the plurality of training reception symbol sequences labeled with a training transmission symbol at the learning position of the interest among consecutive learning transmission symbol sequences.

The generating the neural filter may include generating the neural filter using supervised learning.

The channel equalization method may include pre-storing the neural filter in a memory, The estimating the transmission symbol at the position of interest may include estimating the transmission symbol at the position of interest using the pre-stored neural filter.

The estimating the transmission symbol at the position of interest may include receiving the neural filter from the outside.

The estimating the transmission symbol at the position of interest may include transmitting the plurality of received reception symbol sequences to a cloud including the neural filter; and receiving the transmission symbol at the position of interest output by the neural filter from the cloud.

In accordance with another aspect of the present disclosure, there is provided a non-transitory computer-readable recording medium storing a computer program, which comprises instructions for a processor to perform a channel equalization method, the method comprise: receiving a plurality of consecutive reception symbol sequences through multiple channels; and estimating a transmission symbol at a position of interest among a plurality of consecutive transmission symbol sequences based on the plurality of received reception symbol sequences using a neural filter trained by training reception symbol sequences.

According to an embodiment of the present disclosure, a multi-channel tap effect can be reduced based on received data using nonlinearity. In addition, the amount of computation can be reduced by simply designing a network configuration of a neural filter, and as a result, the neural filter can be efficiently applied to IoT devices.

DETAILED DESCRIPTION

Figure 1:
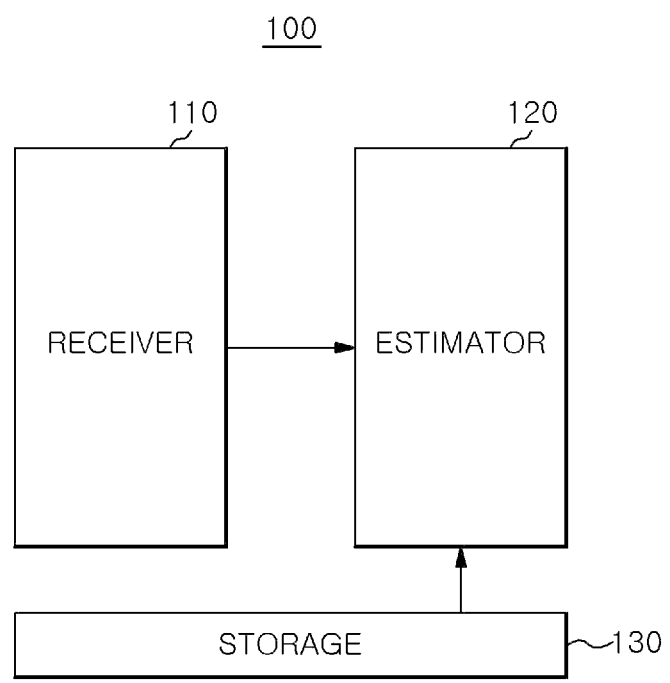
FIG. 1 is a control block diagram of a channel equalization device according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
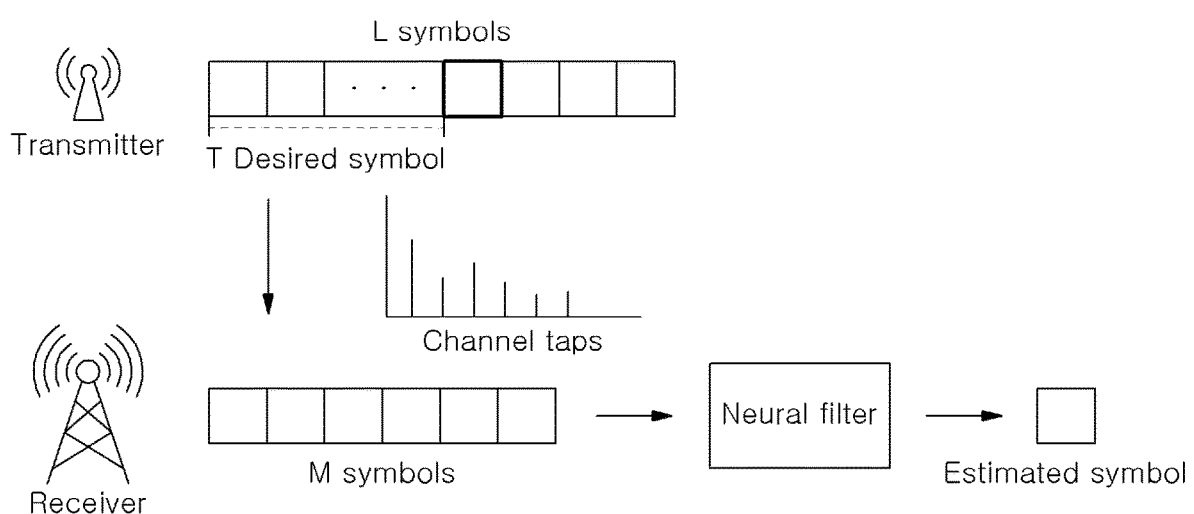
FIG. 2 is a diagram briefly illustrating the operation of the channel equalization device according to an embodiment of the present disclosure.
Figure 3:
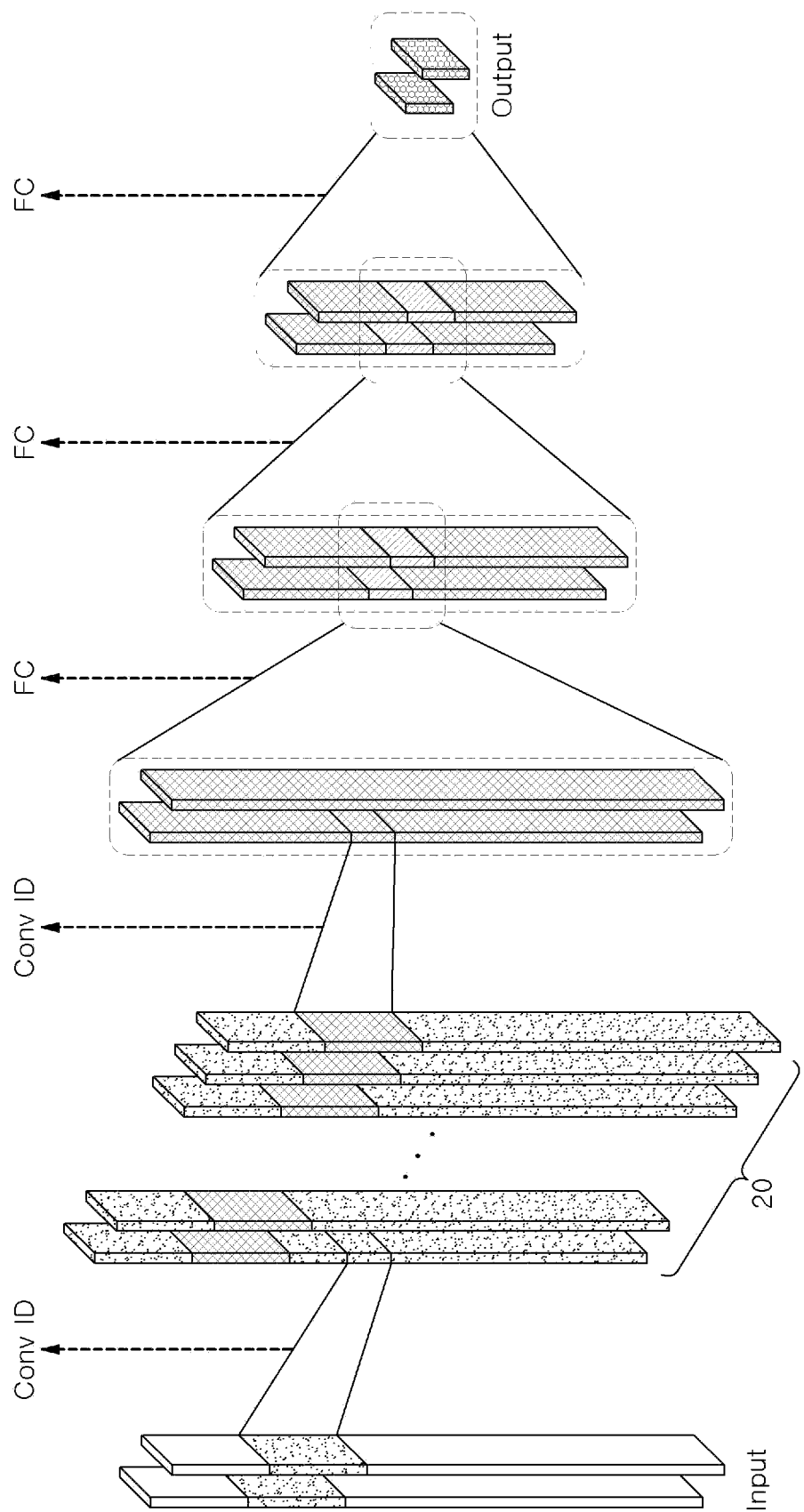
FIG. 3 is a diagram illustrating layers of a neural filter according to an embodiment of the present disclosure.

FIG. 1 is a control block diagram of a channel equalization device according to an embodiment of the present disclosure, FIG. 2 is a diagram briefly illustrating the operation of the channel equalization device according to an embodiment of the present disclosure, and FIG. 3 is a diagram illustrating layers of a neural filter according to an embodiment of the present disclosure.

A channel equalization device of the present disclosure may refer to a device that performs frequency selective channel flattening to improve frequency selective fading of a radio channel at a receiver in wideband communication.

One of conventional linear equalizers that deal with frequency linear fading is LMMSE. In the case of an ideal LMMSE, a transmission signal and a reception signal need to be in a jointly Gaussian distribution relationship to show optimal performance. However, since the jointly Gaussian distribution relationship is not always guaranteed, optimal performance cannot be achieved with LMMSE in practice. In addition, to implement an ideal LMMSE, an accurate SNR value is required along with channel information, but it is difficult to know an accurate SNR in a real-use environment and thus it is necessary to observe reception signal samples and then approximate and use an SNR.

In addition, considering that the LMMSE is a linear equalizer, when the determinant of the LMMSE is developed, the existence of an inverse matrix of a matrix composed of channels cannot be guaranteed and thus it is difficult to ensure optimal performance in practical use.

Hereinafter, the limitations of an LMMSE equalizer will be described with reference to FIG. 2.

Referring to FIG. 2, in a multi-channel situation, there are Nc channel taps, that is, a channel tap vector is defined as $c=[c_0, c_1, \ldots, c_{Nc-1}]^T \in \times 1$. Since channel coherence time is generally longer than transmission time in a wideband system, it is assumed that a channel vector is constant. If a transmission block in a time slot k is defined as $x=[x[k], x[k-1], \ldots, x[k-L+1]]^T \in C^{L \times 1}$, and a reception receiving block according thereto is defined as $y=[y[k], y[k-1], \ldots, y[k-M+1]]^T \in C^{M \times 1}$, the relationship between the transmission block and the reception block is considered as follows.

$$y = Cx + n \qquad \text{[Mathematical expression 1]}$$

Here, $C \in C^{M \times L}$ is a channel impulse response convolution matrix in the form of a Toeplitz matrix composed of a channel vector c, and n~CN(0,σ²·I_M) denotes AWGN. Further, the relation of L=M+N_c−1 is satisfied.

A linear equalizer having size M used to reconstruct the transmission signal performs convolution of the reception signal with a filter weight w=[w_0, w_1, . . . , w_{M-1}]^T and the resulting output is represented as follows.

$$f[k] = \sum_{i=0}^{M-1} w_i^* y[k-i] = w^H y \quad \text{[Mathematical expression 2]}$$

The purpose of an equalization filter is to minimize error between f[k] and a delayed transmission symbol x[k−τ], where τ is a decision delay that is a value defined in advance.

An ideal LMMSE can be used when a channel and an SNR are completely known, and weights of the LMMSE can be defined as follows.

$$w_{LMMSE} = \underset{w}{\arg\min} \mathbb{E}\{(x[k-\tau] - w^H y)^2\} \quad \text{[Mathematical expression 3]}$$

To minimize the expression $$\mathbb{E}\{(x[k-\tau] - w^H y)^2\}$$

defined in Mathematical expression 3, if the expression is differentiated to find a point where it becomes 0 and then arranged with respect to w, the following closed form can be obtained.

$$w_{LMMSE} = \left(CC^H + \frac{\sigma^2}{P_x} \cdot I_M\right)^{-1} C_\tau \quad \text{[Mathematical expression 4]}$$

In Mathematical expression 4, $$P_x = \mathbb{E}\{x^H x\}$$

is the power of the transmission signal, and $C_\tau \in \mathbb{C}^{M\times 1}$ is a (τ+1)-th column of the channel matrix C. An ideal LMMSE equalizer shows optimal performance when a transmission signal and a reception signal is in a jointly Gaussian distribution relationship.

However, since it is impossible to completely ascertain information about a channel, in general, a channel value is estimated using a pilot signal and then used. When $N_{train}$ known samples are given, an ideal LMMSE through sample observation can be estimated as follows.

$$\hat{w}_{LMMSE} = \hat{R}^{-1} \hat{p} \quad \text{[Mathematical expression 5]}$$

In Mathematical expression 5, $\hat{R}$ is a sample autocorrelation matrix, and $\hat{p}$ is a sample cross-correlation vector. Here, the sample autocorrelation matrix is defined as follows.

$$\hat{R} = \quad \text{[Mathematical expression 6]}$$

$$\begin{bmatrix} r_{yy}[0] & r_{yy}[1] & \ldots & r_{yy}[M-1] \\ r_{yy}^*[1] & r_{yy}[0] & \ldots & r_{yy}[M-2] \\ \vdots & \vdots & \ddots & \vdots \\ r_{yy}^*[M-1] & r_{yy}^*[M-2] & \ldots & r_{yy}[0] \end{bmatrix}$$

In Mathematical expression 6, each component satisfies $$r_{yy}[l] = \frac{1}{P_x(M-l)N_{train}}\left(\sum_{k \in \mathcal{K}_{train}} \sum_{j=k-M+1}^{k-l} y[j+l]y^*[j]\right).$$

Further, the sample cross-correlation matrix is represented as follows.

$$\hat{p} = \quad \text{[Mathematical expression 7]}$$

$$[r_{yx}[0], r_{yx}[1], \ldots, r_{yx}[M-2], r_{yx}[M-1]]^T$$

In Mathematical expression 7, each element satisfies $$r_{yx}[n] = \frac{1}{P_x N_{train}}\left(\sum_{k \in \mathcal{K}_{train}} x^*[k-\tau]y[k-n]\right).$$

Here, k denotes a time slot index of each of $N_{train}$ blocks, and $\mathcal{K}_{train}$ denotes a set including such k.

Meanwhile, in an ideal LMMSE, all estimated symbols for all decision delays τ are represented as the following mathematical expression on the assumption that an SNR is high.

$$\hat{x} = C^H(CC^H)^{-1}Cx \quad \text{[Mathematical expression 8]}$$

In Mathematical expression 8, $\hat{x} \in \mathbb{C}^{L\times 1}$ is an estimated transmission symbol vector. If both sides of Mathematical expression 8 are multiplied by a matrix $C^H C$ and then rearranged, the following Mathematical expression is obtained.

$$C^H C(\hat{x} - x) = 0 \quad \text{[Mathematical expression 9]}$$

In Mathematical expression 9, assuming that there is an inverse matrix of $C^H C \in \mathbb{C}^{L\times L}$, an ideal LMMSE can perform perfect estimation. That is, $\hat{x}=x$. However, since the square matrix $C^H C$ has rank M which is not full-rank, there is no inverse matrix.

To solve this problem, the channel equalization device 100 according to an embodiment of the present disclosure may estimate a transmission signal at a position of interest among transmission signal sequences using a neural filter instead of LMMSE.

Referring to FIG. 1, the channel equalization device 100 according to an embodiment of the present disclosure may include a receiver 110 and an estimator 120.

The receiver 110 may receive a plurality of consecutive reception symbol sequences through multiple channels, and the estimator 120 may estimate a transmission symbol at a position of interest among a plurality of consecutive transmission symbol sequences based on the received reception symbol sequences. Here, a transmission symbol sequence may mean a symbol sequence transmitted by a transmitter, and a reception symbol sequence may mean a symbol sequence received by a receiver when a multi-channel tap effect is applied to a transmission symbol sequence during transmission through multiple channels of a wideband. In addition, a position of interest means a specific order determined based on the first symbol of a transmission symbol sequence and may follow a decision delay τ.

Here, the estimator 120 may use a neural filter to reduce the multi-channel tap effect of the received symbol sequences. The neural filter used by the estimator 120 may be a neural network generated by learning training reception symbol sequences.

Referring to FIG. 3, a neural filter according to an embodiment of the present disclosure may be designed to find a better mapping function by learning training data based on a universal approximation theorem. When a dataset composed of $N_{train}$ pilot sequence pairs, $D=\{(x^{(n)} \in C^{L \times 1}, y^{(n)} \in C^{M \times 1}): n=1, \ldots, N_{train}\}$, is given, a loss function that the neural filter parameterized by θ is trying to minimize is as follows.

[Mathematical expression 10]
$$L_D(\theta) = \frac{1}{N_{train}} \sum_{n=1}^{N_{train}} (f_{NF}(y^{(n)}; \theta) - x^{(n)}[k - \tau])^2$$

In Mathematical expression 10, $f_{NF}(\cdot; \theta)$ denotes the output of the neural filter. The structure of the neural filter according to an embodiment of the present disclosure is as shown in FIG. 3 and includes a total of five hidden layers. One-dimensional convolution is performed on the first two layers, and the remaining three layers are fully connected layers. The number of channels is increased to 20 through the first convolution layer and then reduced to 2 through the next convolution layer. The sizes of the hidden layers of the fully connected layers are K, (K//2+1), and (K//5+1) where $K=[(M+1-N_c-M//N_c)/4]+1$ is satisfied. An activation function used in all layers is Gaussian error linear unit (GELU).

However, since the neural filter structure of FIG. 3 is only an example, the structure of the neural filter may be designed in various manner within the scope of achieving the technical features of the present disclosure.

At least some components of the channel equalization device 100 according to an embodiment of the present disclosure may be implemented by an arithmetic device including a memory including control software programmed to perform these functions and a microprocessor for executing such software. Each component of the channel equalization device 100 according to the embodiment of FIG. 1 may be independently implemented by a microprocessor, or at least two components may be implemented by one microprocessor.

Meanwhile, the channel equalization device 100 according to an embodiment of the present disclosure may store a neural filter in advance and provide the neural filter at the request of the estimator 120. Specifically, the channel equalization device 100 shown in FIG. 1 may further include a storage 130 that stores a neural filter in advance and provide the previously stored neural filter to the estimator 120 at the request of the estimator 120.

In this case, the channel equalization device 100 according to an embodiment of the present disclosure may further include a learning unit 140 that generates a neural filter in advance through learning. The learning unit 140 may learn a plurality of training reception symbol sequences labeled with a training transmission symbol at a position of interest among consecutive training transmission symbol sequences. At this time, the learning unit 140 according to an embodiment of the present disclosure may perform learning through supervised learning.

Unlike the configuration shown in FIG. 1, a channel equalization device 100 according to another embodiment of the present disclosure may further include a communication unit for receiving a neural filter from an external device or server at the request of the estimator 120. Furthermore, the estimator 120 of the channel equalization device 100 according to another embodiment of the present disclosure may transmit a plurality of reception symbol sequences received by the receiver 110 to a cloud including a neural filter and receive a transmission symbol at a position of interest output by the neural filter from the cloud.

The configuration of the channel equalization device 100 according to an embodiment of the present disclosure has been described. Hereinafter, a channel equalization method performed by the channel equalization device 100 according to an embodiment of the present disclosure described above will be described.

Figure 4:
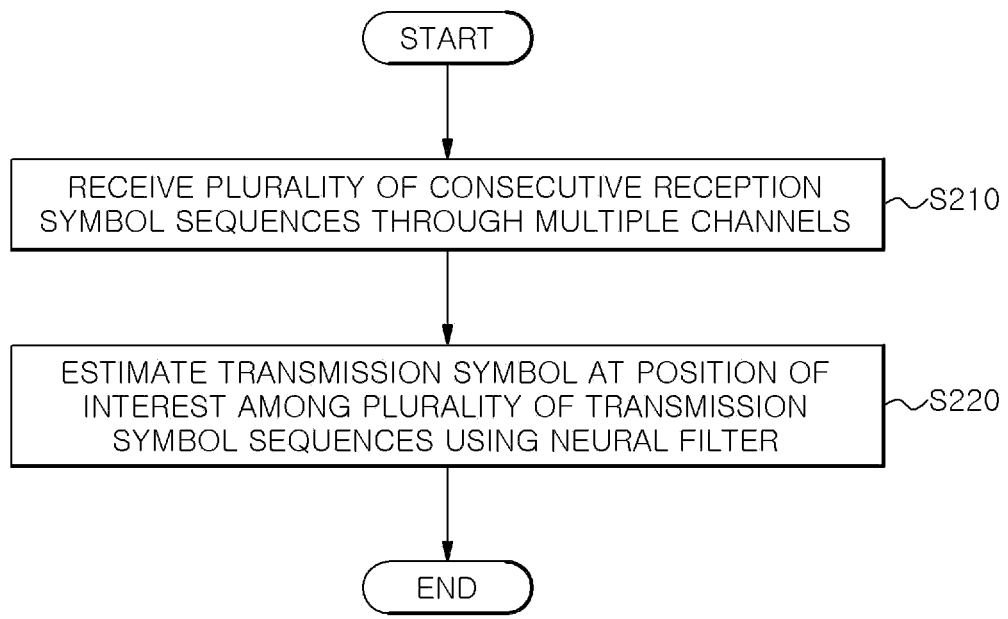
FIG. 4 is a flowchart of a channel equalization method according to an embodiment of the present disclosure.

FIG. 4 is a flowchart of a channel equalization method according to an embodiment of the present disclosure.

First, the channel equalization device 100 according to an embodiment of the present disclosure may receive a plurality of consecutive reception symbol sequences through multiple channels (S210). Specifically, the receiver 110 of the channel equalization device 100 according to an embodiment of the present disclosure may receive a plurality of reception symbol sequences corresponding to a plurality of transmission symbol sequences transmitted by a transmitter and affected by a multi-channel tap effect.

After receiving the reception symbol sequences, the channel equalization device 100 according to an embodiment of the present disclosure may estimate a transmission symbol at a position of interest among a plurality of consecutive transmission symbol sequences using a neural filter (S220). As described above, the neural filter is generated by learning a plurality of training reception symbol sequences labeled with a training transmission symbol at a position of interest among consecutive training transmission symbol sequences.

Specifically, the estimator 120 of the channel equalization device 100 according to an embodiment of the present disclosure may retrieve the neural filter pre-stored in the storage 130 and estimate the transmission symbol at the position of interest. Unlike this, the estimator 120 of the channel equalization device 100 according to another embodiment of the present disclosure may estimate the transmission symbol at the position of interest using a neural filter received from an external device through the communication unit, and the estimator 120 of the channel equalization device 100 according to another embodiment of the present disclosure may transmit a plurality of reception symbol sequences received by the receiver 110 to a cloud including a neural filter and receive the transmission symbol at the position of interest output by the neural filter from the cloud.

The channel equalization method according to an embodiment of the present disclosure has been described. Hereinafter, performance according to the above-described channel equalization method will be described.

Figure 5:
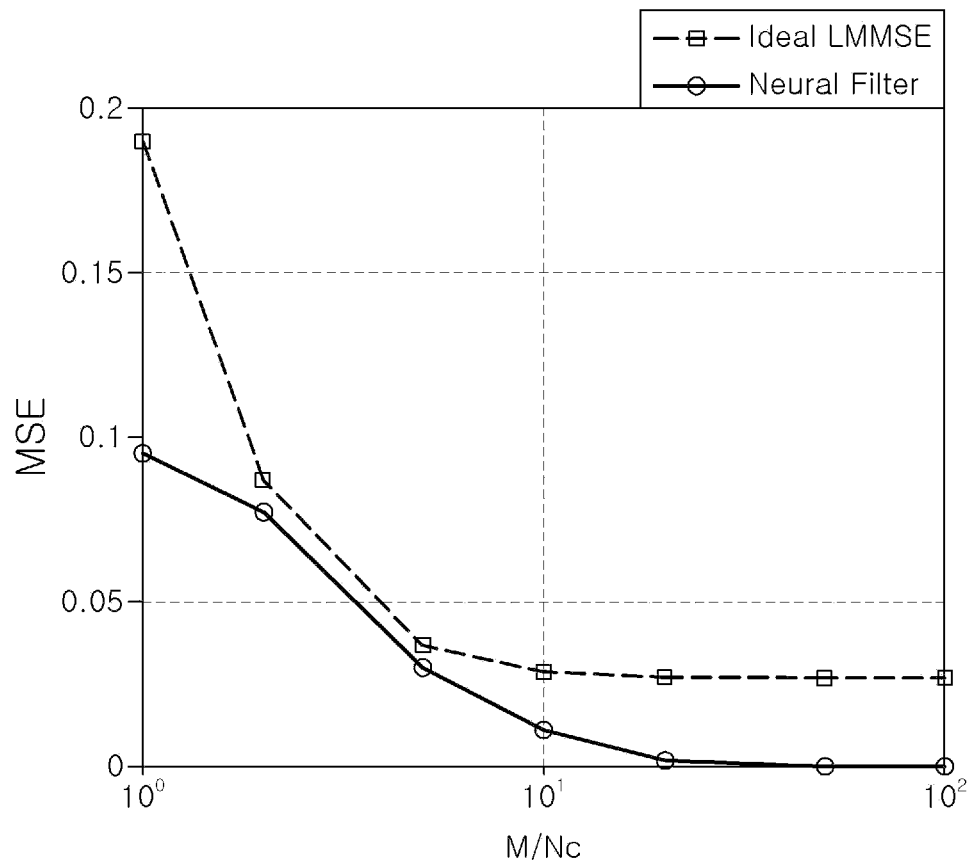
FIG. 5 is a diagram showing an MSE change in a neural filter according to a change in a filter size with respect to the number of channel taps in the channel equalization method according to an embodiment of the present disclosure.
Figure 6:
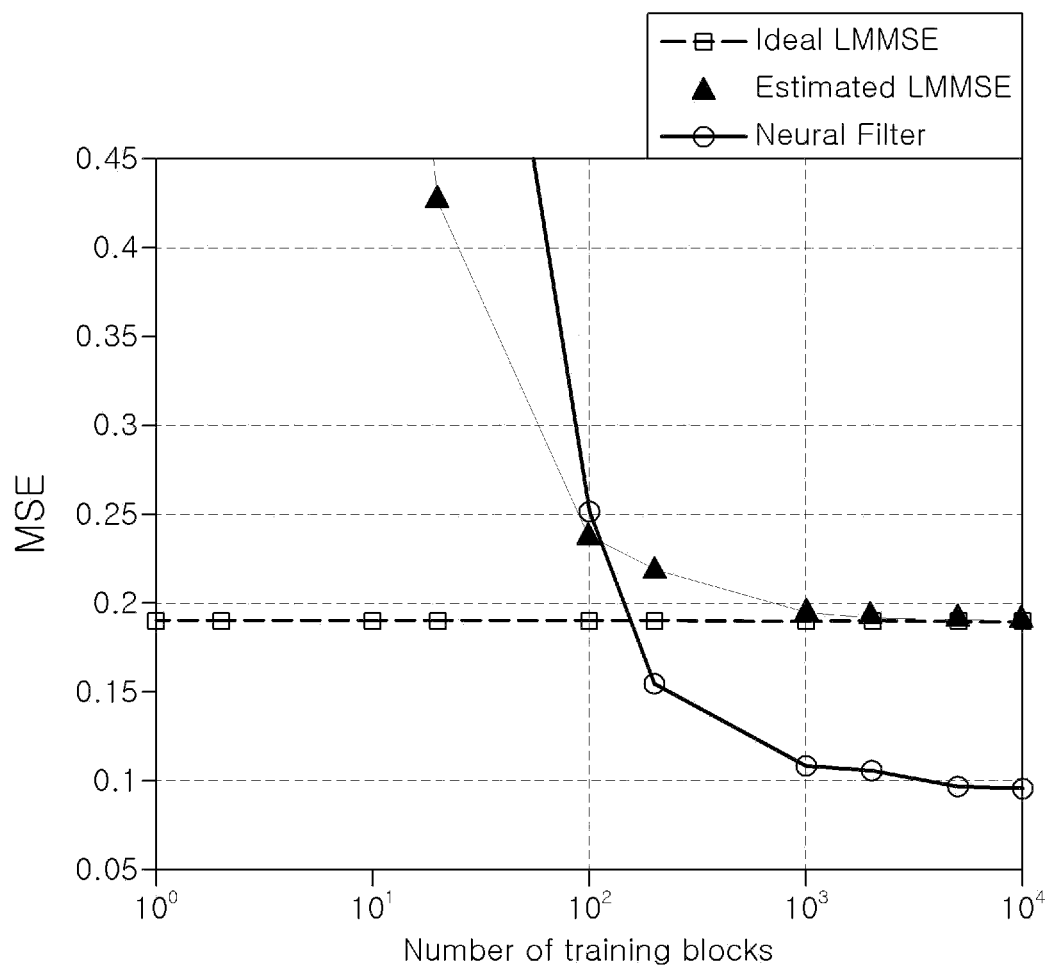
FIG. 6 is a diagram showing MSE performance of the neural filter according to the number of blocks used for learning in the channel equalization method according to an embodiment of the present disclosure.
Figure 7:
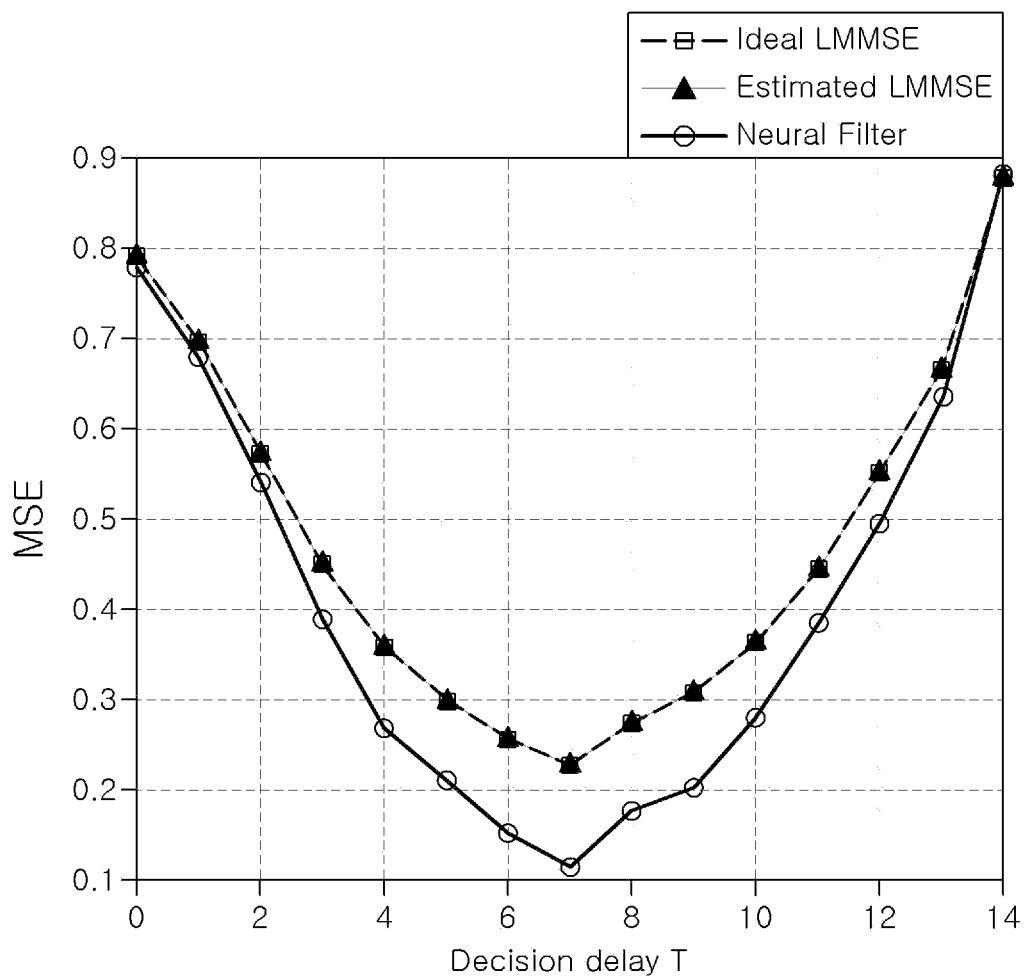
FIG. 7 is a diagram showing MSE performance of the neural filter according to a change in decision delay τ in the channel equalization method according to an embodiment of the present disclosure.
Figure 8:
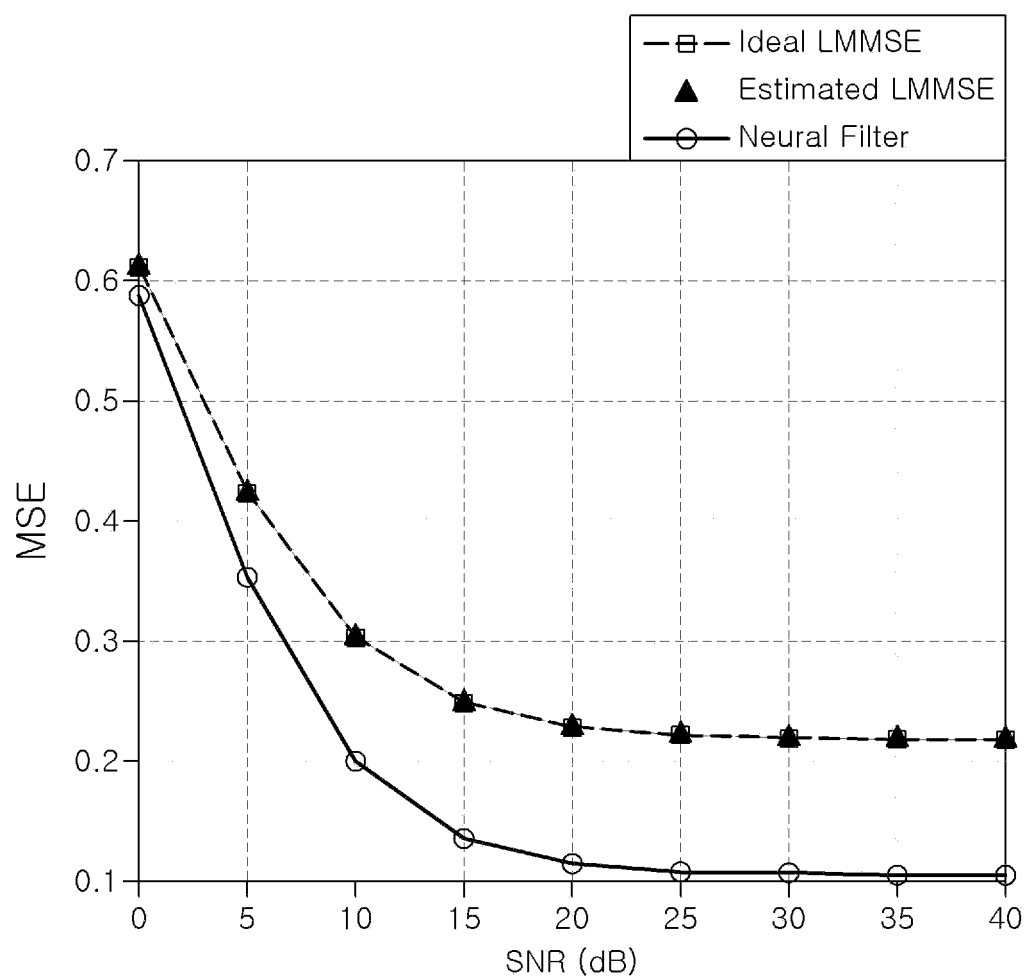
FIG. 8 is a diagram showing MSE performance of the neural filter according to an SNR value in the channel equalization method according to an embodiment of the present disclosure.

FIG. 5 is a diagram showing an MSE change in a neural filter according to a change in a filter size with respect to the number of channel taps in the channel equalization method according to an embodiment of the present disclosure, FIG. 6 is a diagram showing MSE performance of the neural filter according to the number of blocks used for learning in the channel equalization method according to an embodiment of the present disclosure, FIG. 7 is a diagram showing MSE performance of the neural filter according to a change in decision delay τ in the channel equalization method according to an embodiment of the present disclosure, and FIG. 8 is a diagram showing MSE performance of the neural filter according to an SNR value in the channel equalization method according to an embodiment of the present disclosure.

In FIGS. 5 to 8, it is assumed that a QPSK demodulation method is used, the number of channel taps NC is 8, and independent and identically distributed (i.i.d) Rayleigh fading occurs in respective cases. In addition, cases in which the number of training/test data blocks is 10,000 and 300,000 are exemplified, and it is assumed that learning rate scheduling with warmup and AdamW optimizer are used.

FIG. 5 shows a comparison of MSE performances according to a change in a filter size M for a fixed number $N_C$ of channel taps. Here, it is assumed that a decision delay and an SNR are τ=L/2 and 20 dB, and 10,000 training blocks are given. Since there are sufficient training blocks, the LMMSE shown in FIG. 5 can be regarded as an ideal LMMSE. It can be confirmed that the performance of the neural filter is higher than that of the LMMSE for all ratios.

In FIGS. 6 to 8, the filter size is assumed to be M=8 in order to check the most intractable situation.

FIG. 6 shows a change in MSE performance with respect to the number of training blocks. It is assumed that a decision delay and an SNR are τ=L/2 and 20 dB. It can be confirmed that the ideal LMMSE has higher MSE performance than the estimated LMMSE and the neural filter in an area where a small number of training samples are given through Fi. 4, but the neural filter has the highest performance from a point at which about 100 training blocks are given. This result may be caused by the advantage of deep learning that can extract features from a lot of data.

FIG. 7 shows a comparison of changes in MSE according to decision delay for three methods (ideal LMMSE, estimated LMMSE, and neural filter). The decision delay is a variable related to a symbol to be reconstructed in a transmission block, and a symbol of interest may change as the variable changes. As a result, the amount of information of the symbol of interest reflected in a received block may also vary. For example, when L=$N_C$+M−1=15 and τ is 0 or 14, referring to Mathematical expression 1, equalization may be difficult to perform because there is little information about the symbol of interest included in the received block. Therefore, selection of τ affects the equalization performance, and it can be confirmed through FIG. 7 that neural filtering can minimize the MSE by using given information most efficiently as compared to the existing linear methods.

FIG. 8 shows a comparison of MSE performances according to SNR change for three schemes. It is assumed that the number $N_{train}$ of training blocks is 10,000, M=8, and τ=L/2. Referring to FIG. 8, it can be confirmed that the MSE performance of the neural filter is higher for any SNR as in FIGS. 5 to 7.

As described above, according to an embodiment of the present disclosure, the multi-channel tap effect can be reduced based on received data by using nonlinearity. In addition, the amount of computation can be reduced by simply designing the network configuration of the neural filter, and as a result, the neural filter can be efficiently applied to IoT devices.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A channel equalization device comprising:
   a receiver configured to receive a plurality of consecutive reception symbol sequences through multiple channels of a wideband;
   a memory storing one or more instructions; and
   a processor configured to execute the one or more instructions stored in the memory, wherein the instructions, when executed by the processor, cause the processor to estimate a transmission symbol at a position of interest among a plurality of consecutive transmission symbol sequences based on the received plurality of consecutive reception symbol sequences using a neural filter to reduce a multi-channel tap effect of the received plurality of consecutive reception symbol sequences, wherein the neural filter is trained by a plurality of training reception symbol sequences, wherein the neural filter includes at least two 1-D convolution layers, and wherein one of the at least two 1-D convolution layers is configured to expand channels of the received plurality of consecutive reception symbol sequences to generate a plurality of channels, and another of the at least two 1-D convolution layers is configured to reduce the generated plurality of channels into a predetermined number of channels.

2. The channel equalization device of claim 1, wherein the processor is configured to generate the neural filter by training the plurality of training reception symbol sequences.

3. The channel equalization device of claim 2, wherein the processor is configured to train the plurality of training reception symbol sequences labeled with a training transmission symbol at a learning position of interest among consecutive learning transmission symbol sequences.

4. The channel equalization device of claim 2, wherein the processor is configured to generate the neural filter using supervised learning.

5. The channel equalization device of claim 1, wherein the memory is configured to store the neural filter in advance and provide the neural filter stored in advance to the processor.

6. The channel equalization device of claim 1, further comprising a communication unit configured to receive the neural filter from the outside and provide the neural filter to the processor.

7. The channel equalization device of claim 1, wherein the processor is configured to transmit the received plurality of consecutive reception symbol sequences to a cloud including the neural filter and receive the transmission symbol at the position of interest output by the neural filter from the cloud.

8. A channel equalization method comprising:

receiving a plurality of consecutive reception symbol sequences through multiple channels of a wideband; and estimating a transmission symbol at a position of interest among a plurality of consecutive transmission symbol sequences based on the received plurality of consecutive reception symbol sequences using a neural filter to reduce a multi-channel tap effect of the received plurality of consecutive reception symbol sequences, wherein the neural filter is trained by a plurality of training reception symbol sequences, wherein the neural filter includes at least two 1-D convolution layers, and wherein one of the at least two 1-D convolution layers is configured to expand channels of the received plurality of consecutive reception symbol sequences to generate a plurality of channels, and another of the at least two 1-D convolution layers is configured to reduce the generated plurality of channels into a predetermined number of channels.

9. The channel equalization method of claim 8, further comprising generating the neural filter by training the plurality of training reception symbol sequences.

10. The channel equalization method of claim 9, wherein the generating the neural filter includes learning the plurality of training reception symbol sequences labeled with a training transmission symbol at a learning position of interest among consecutive learning transmission symbol sequences.

11. The channel equalization method of claim 9, wherein the generating the neural filter includes generating the neural filter using supervised learning.

12. The channel equalization method of claim 8, further comprising pre-storing the neural filter in a memory, wherein the estimating the transmission symbol at the position of interest includes estimating the transmission symbol at the position of interest using the pre-stored neural filter.

13. The channel equalization method of claim 8, wherein the estimating the transmission symbol at the position of interest includes receiving the neural filter from the outside.

14. The channel equalization method of claim 13, wherein the estimating the transmission symbol at the position of interest includes:

transmitting the received plurality of consecutive reception symbol sequences to a cloud including the neural filter; and receiving the transmission symbol at the position of interest output by the neural filter from the cloud.

15. A non-transitory computer readable storage medium storing computer executable instructions, wherein the instructions, when executed by a processor, cause the processor to perform a channel equalization method, the method comprising:

receiving a plurality of consecutive reception symbol sequences through multiple channels of a wideband; and estimating a transmission symbol at a position of interest among a plurality of consecutive transmission symbol sequences based on the received plurality of consecutive reception symbol sequences using a neural filter to reduce a multi-channel tap effect of the received plurality of consecutive reception symbol sequences, wherein the neural filter is trained by a plurality of training reception symbol sequences, wherein the neural filter includes at least two 1-D convolution layers, and wherein one of the at least two 1-D convolution layers is configured to expand channels of the received plurality of consecutive reception symbol sequences to generate a plurality of channels, and another of the at least two 1-D convolution layers is configured to reduce the generated plurality of channels into a predetermined number of channels.

16. The non-transitory computer readable storage medium of claim 15, further comprising generating the neural filter by training the plurality of training reception symbol sequences.

17. The non-transitory computer readable storage medium of claim 16, wherein the generating the neural filter includes learning the plurality of training reception symbol sequences labeled with a training transmission symbol at a learning position of interest among consecutive learning transmission symbol sequences.

18. The non-transitory computer readable storage medium of claim 16, wherein the generating the neural filter includes generating the neural filter using supervised learning.

19. The non-transitory computer readable storage medium of claim 15, further comprising pre-storing the neural filter in a memory, wherein the estimating the transmission symbol at the position of interest includes estimating the transmission symbol at the position of interest using the pre-stored neural filter.

20. The non-transitory computer readable storage medium of claim 15, wherein the estimating the transmission symbol at the position of interest includes receiving the neural filter from the outside.

\* \* \* \* \*